US 9,906,490 B2

(12) United States Patent
Na

(10) Patent No.: US 9,906,490 B2
(45) Date of Patent: Feb. 27, 2018

(54) RELAY MANAGING METHOD AND NETWORK MANAGEMENT SYSTEM SERVER USING THE SAME

(71) Applicant: SOLID, INC., Gyeonggi-do (KR)

(72) Inventor: Bong Cheol Na, Gyeonggi-do (KR)

(73) Assignee: SOLID, LTD., Seongnam-si (KR)

( * ) Notice: Subject to any disclaimer, the term of this patent is extended or adjusted under 35 U.S.C. 154(b) by 9 days.

(21) Appl. No.: 14/411,476

(22) PCT Filed: Dec. 23, 2013

(86) PCT No.: PCT/KR2013/012040
§ 371 (c)(1),
(2) Date: Dec. 26, 2014

(87) PCT Pub. No.: WO2015/076454
PCT Pub. Date: May 28, 2015

(65) Prior Publication Data
US 2016/0269357 A1   Sep. 15, 2016

(30) Foreign Application Priority Data
Nov. 22, 2013   (KR) ........................ 10-2013-0142947

(51) Int. Cl.
*G06F 15/16* (2006.01)
*H04L 29/12* (2006.01)
(Continued)

(52) U.S. Cl.
CPC ........ *H04L 61/255* (2013.01); *H04L 61/2007* (2013.01); *H04L 61/2015* (2013.01); *H04L 41/0695* (2013.01); *H04L 43/0817* (2013.01)

(58) Field of Classification Search
CPC ............. H04L 41/0695; H04L 43/0817; H04L 61/2007; H04L 61/2015; H04L 61/255
(Continued)

(56) References Cited

U.S. PATENT DOCUMENTS 7,216,166 B2 * 5/2007 Sugauchi ............ H04L 41/0853
709/220
7,292,851 B2 * 11/2007 Kobayashi ............ H04L 12/189
455/430

(Continued)

FOREIGN PATENT DOCUMENTS

KR   10-2005-0000870   1/2005
KR   10-2010-0067271   6/2010

OTHER PUBLICATIONS

International Search Report issued in PCT/KR2013/012040 dated Dec. 23, 2013.
Written Opinion issued in PCT/KR2013/012040 dated Aug. 6, 2014.

*Primary Examiner* — Ario Etienne
*Assistant Examiner* — Thorne E Waugh
(74) *Attorney, Agent, or Firm* — Sughrue Mion, PLLC

(57) ABSTRACT

In a relay managing method through a network management system (NMS) server, a registration request is received from a relay BTS interface unit (BIU). The identification information of the BIU that transmits the registration request is compared with a previously registered BIU registration table, and a new BIU ID is provided to the BIU that transmits the registration request, when information corresponding to the identification information of the BIU that transmits the registration request does not exist in the BIU registration table. Subsequently, registration is performed by mapping the identification information of the BIU that transmits the registration request and allocation IP information to the provided new BIU ID.

9 Claims, 5 Drawing Sheets

(51) Int. Cl.
*H04L 12/26* (2006.01)
*H04L 12/24* (2006.01)

(58) Field of Classification Search
USPC .................................................. 709/203–230
See application file for complete search history.

(56) References Cited

U.S. PATENT DOCUMENTS

| | | | |
|---|---|---|---|
| 8,255,464 B2* | 8/2012 | Wilkins | G06Q 10/10 709/206 |
| 8,375,128 B2* | 2/2013 | Tofighbakhsh | H04L 12/14 455/406 |
| 8,649,684 B2* | 2/2014 | Casterline | H04B 10/25754 398/115 |
| 8,908,698 B2* | 12/2014 | Aguayo | H04L 12/4633 370/395.53 |
| 8,983,463 B2* | 3/2015 | Yoshimura | H04W 60/04 455/404.2 |
| 9,179,321 B2* | 11/2015 | Hasarchi | H04B 7/024 |
| 9,356,801 B2* | 5/2016 | Tamura | H04L 12/4662 |
| 2008/0002625 A1* | 1/2008 | Cho | H04W 8/26 370/331 |
| 2010/0014506 A1* | 1/2010 | Linkola | H04W 88/08 370/352 |
| 2010/0248720 A1* | 9/2010 | Millet | H04W 12/06 455/435.1 |
| 2013/0010640 A1 | 1/2013 | Higuchi et al. | |
| 2014/0244819 A1* | 8/2014 | Patrick | H04L 41/0806 709/223 |

* cited by examiner

FIG. 4

BIU Setup

Unassigned BIU

| No. | Use | BIU | Name | IP | Serial No. |
|---|---|---|---|---|---|
| 1 | ☑ | BDU1 ▶ | FGHIJK | 192.168.1.104 | BJU0002-BIU |
| 2 | ☑ | BDU1 ▶ | ABCDE | 192.168.1.102 | BJU0001-BIU |

Apply

Assigned BIU

| No. | Use | BIU | Sync State | Name | IP | Serial No. | Note. |
|---|---|---|---|---|---|---|---|

Add   Apply

RELAY MANAGING METHOD AND NETWORK MANAGEMENT SYSTEM SERVER USING THE SAME

TECHNICAL FIELD

The present invention relates to a relay managing method related to Internet protocol (IP) allocation of a BTS interface unit (BIU) of each relay, registration of the BIU and update of the registration, and a network management system (NMS) server using the same.

BACKGROUND ART

In a relay system, when relays are installed, a network management system (NMS) server for monitoring each relay is installed together with the relays. According to a conventional art, in order to connect a BTS interface unit (BIU) of each relay to the NMS server, a GUI for local is installed in each BIU at a local place, and a manager directly performs an Internet protocol (IP) setup operation. Therefore, there is a an inconvenience in that, in order to perform communication connection between the NMS server and the BIU of each relay, the manager should undergo a serious of processes of memorizing IPs respectively registered in the BIUs one by one and registering the memorized IPs in the NMS server. Also, there is a problem in that an error may occur in an IP setup operation of a non-expert.

Technical Problem

An embodiment of the present invention is directed to a relay managing method and a network management system (NMS) server using the same, which can automate and manage, in a simple and reliable manner, Internet protocol (IP) allocation, registration and operating processes for communication connection between the NMS server and a BTS interface unit (BIU) of each relay.

Technical Solution

According to an aspect of the present invention, a relay managing method in a network management system (NMS) server, the method includes: receiving a registration request from a relay BTS interface unit (BIU), wherein the registration request includes identification information of a BIU and an Internet protocol (IP) information allocated to the BIU, and the identification information includes BIU name information and a BIU device serial number; comparing the identification information of the BIU that transmits the registration request with a previously registered BIU registration table, providing a new BIU ID to the BIU that transmits the registration request, when information corresponding to the identification information of the BIU that transmits the registration request does not exist in the BIU registration table, and performing registration by mapping the identification information of the BIU that transmits the registration request and allocation IP information to the provided new BIU ID; and using an existing BIU ID as it is, when information corresponding to any one of the identification information of the BIU that transmits the registration request exists in the BIU registration table, and updating and storing information mapped to the existing BIU ID as the identification information of the BIU that transmits the registration request and the allocation IP information.

The BIU registration table may be a table in which BIU name information, a BIU device serial number and allocation IP information are mapped to a BIU ID with respect to a specific BIU.

The method may further include receiving an IP allocation request from a BIU; and automatically allocating an available IP to the BIU that transmits the IP allocation request by identifying the available IP according to the received IP allocation request.

The automatically allocating of the available IP may include identifying the identification information of the BIU that transmits the IP allocation request, and allocating, as the available IP, the IP mapped to the existing BIU ID of the corresponding information in the BIU registration table, when information corresponding to any one of the identification information of the BIU that transmits the IP allocation request exists in the BIU registration table.

The method may further include storing and linking relay setting information on a registered BIU up with BIU name information. When information corresponding to any one of the identification information of the BIU that transmits the registration request exists in the BIU registration table, the stored and linked relay setting information up with the existing BIU name of the corresponding information in the BIU registration table may be recovered and used as it is.

According to another aspect of the present invention, an NMS server communicated and interlocked with a BIU of each relay in a relay system through a BIU interface, the NMS server includes: a communication interface unit configured to receive a registration request from a BIU, wherein the registration request includes identification information of a BIU and an IP information allocated to the BIU, and the identification information includes BIU name information and a BIU device serial number; a comparison unit configured to compare the identification information of the BIU that transmits the registration request with a previously registered BIU registration table, wherein the BIU registration table is a table in which BIU name information, a BIU device serial number and allocation IP information are mapped to a BIU ID with respect to a specific BIU; and a BIU registration unit configured to provide a new BIU ID to the BIU that transmits the registration request, when information corresponding to the identification information of the BIU that transmits the registration request does not exist in the BIU registration table, and update and store information mapped to the existing BIU ID as the identification information of the BIU that transmits the registration request and the allocation IP information, using an existing BIU ID as it is, when information corresponding to any one of the identification information of the BIU that transmits the registration request exists in the BIU registration table.

The NMS server may further include a dynamic host configuration protocol (DHCP) unit configured to identifies, when the communication interface unit receives an IP allocation request from a BIU, an available IP according to the received IP allocation request and automatically allocate the available IP to the BIU that transmits the IP allocation request.

The DHCP unit may identify the identification information of the BIU that transmits the IP allocation request, and allocate, as the available IP, the IP mapped to the existing BIU ID of the corresponding information in the BIU registration table, when information corresponding to any one of the identification information of the BIU that transmits the IP allocation request exists in the BIU registration table.

The BIU registration unit may store and link relay setting information on a registered BIU up with BIU name information. When information corresponding to any one of the identification information of the BIU that transmits the registration request exists in the BIU registration table, the BIU registration unit may recover and use the stored and linked relay setting information up with the existing BIU name of the corresponding information in the BIU registration table as it is.

It should be understood that different embodiments of the invention, including those described under different aspects of the invention, are meant to be generally applicable to all aspects of the invention. Any embodiment may be combined with any other embodiment unless inappropriate. All examples are illustrative and non-limiting.

Advantageous Effects

In the relay managing method and the NMS server using the same according to the present invention, it is possible to automate and manage, in a simple and reliable manner, IP allocation, registration and operating processes for communication connection between the NMS server and a BIU of each relay.

Also, the setup time of the relay system can be reduced due to a simple registration procedure, and an error problem caused by a non-expert in a setup process can be solved. Also, communication interlocking is possible without any influence on connection and management between the NMS server and a relay at a corresponding position even though a BIU IP change or/and BIU replacement is performed, thereby improving the reliability of the system.

BRIEF DESCRIPTION OF THE DRAWINGS

FIGS. 4 and 5 are exemplary diagrams illustrating a process of registering a BTS interface unit (BIU) of a relay.

MODE FOR CARRYING OUT THE INVENTION

Figure 1:
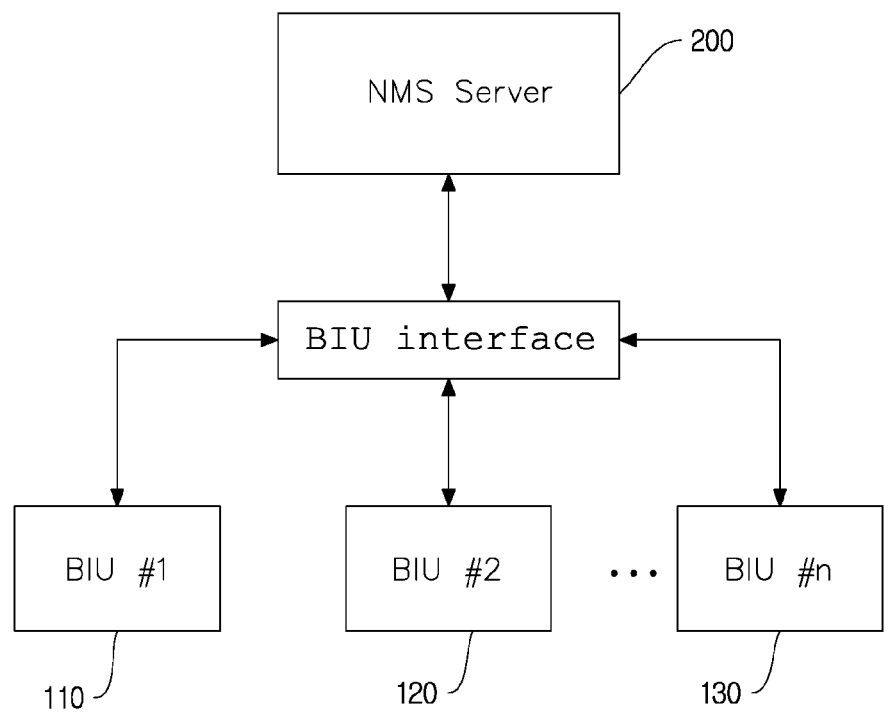
FIG. 1 is a block diagram illustrating an interlocking relationship between a relay system and a network management system (NMS) server according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Throughout the description of the present invention, when describing a certain technology is determined to evade the point of the present invention, the pertinent detailed description will be omitted. Numerals (e.g., first, second, etc.) used in the description of the present invention are only for distinguishing one element from another element.

When one element is described as being "connected" or "accessed" to another element, it shall be construed as being connected or accessed to the other element directly but also as possibly having another element in between. On the other hand, if one element is described as being "directly connected" or "directly accessed" to another element, it shall be construed that there is no other element in between.

FIG. 1 is a block diagram illustrating an interlocking relationship between a relay system and a network management system (NMS) server according to an embodiment of the present invention. Referring to FIG. 1, the NMS server 200 and a BTS interface unit (BIU) 110, 120 or 130 included in each of a plurality of relays constituting the relay system are communicated and connected to each other through a BIU interface.

The NMS sever 200 is a server installed together relays when the relays are installed in order to monitor and manage the relay system. The BIUs 110, 120 and 130 are included in the respective relays for the purpose of interlocking with a base transceiver system (BTS). As shown in FIG. 1, the NMS server 200 is interlocked with the BIUs 110, 120 and 130 to perform monitoring and central management of the relay system. To this end, a process of registering the BIU is required. According to the conventional art, a GUI for local is installed at a local place (i.e., a place at which a BIU is installed), and accordingly, a series of processes related to BIU registration are performed in a manual manner, which is inconvenience. Also, there occurs a problem in that an error is caused by a non-expert.

Accordingly, in the embodiment of the present invention, a relay managing method is proposed in which the process of registering the BIU is automated and managed in the NMS server 200, thereby improving the reliability of the method and simplifying the registration process. This will be described in detail hereinbelow with reference to FIGS. 2 to 5.

Figure 2:
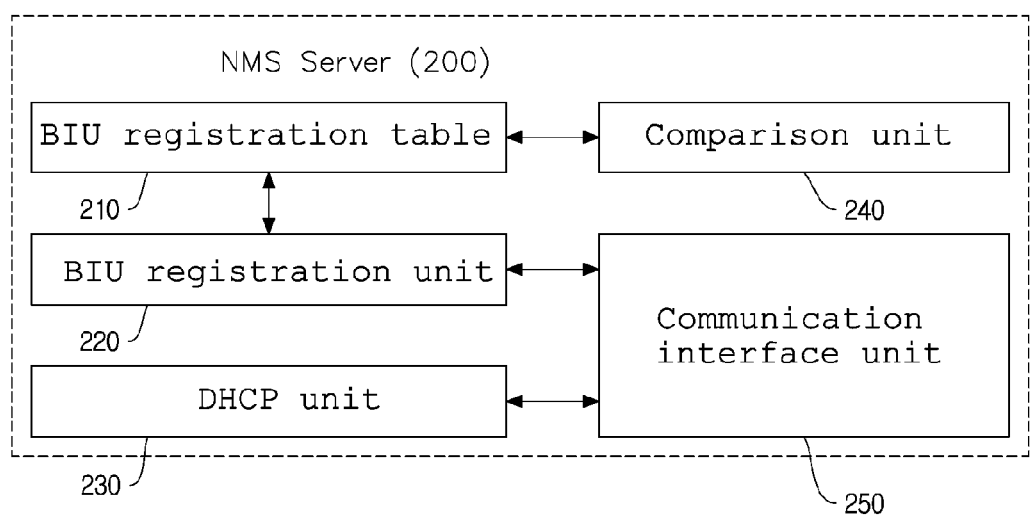
FIG. 2 is a block diagram of the NMS server according to the embodiment of the present invention.
Figure 3:
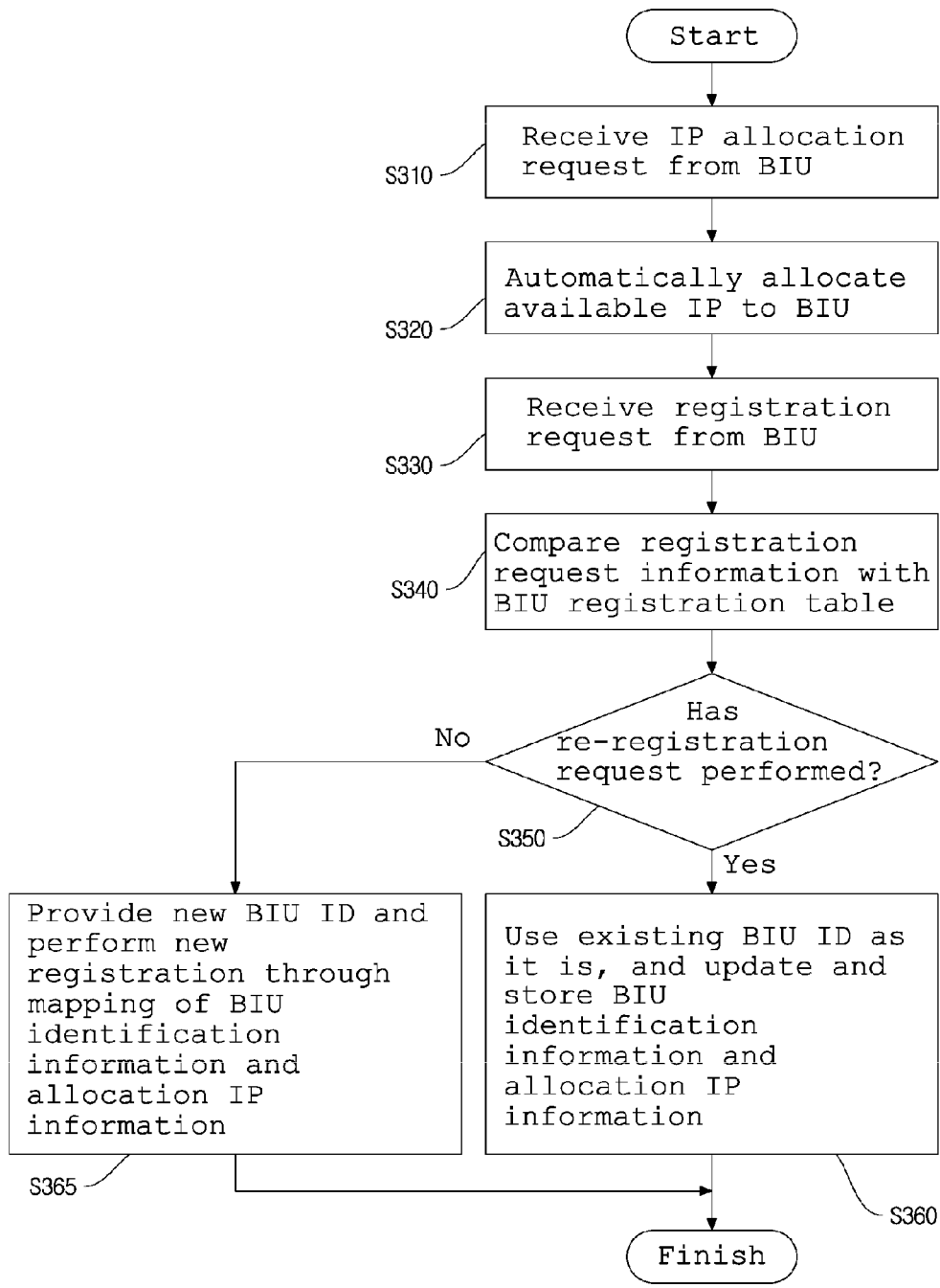
FIG. 3 is a flowchart illustrating a relay managing method in the NMS server according to the embodiment of the present invention.

FIG. 2 is a block diagram of the NMS server according to the embodiment of the present invention. FIG. 3 is a flowchart illustrating a relay managing method in the NMS server according to the embodiment of the present invention. Hereinafter, the embodiment of the present invention will be described with reference to FIGS. 2 and 3 in conjunction with FIGS. 4 and 5. In this state, the embodiment of the present invention will be described together with reference to FIGS. 4 and 5.

First, in the relay managing method in the NMS server 200 according to the embodiment of the present invention, a manager of the NMS server 200 does not directly register an Internet protocol (IP) to be allocated to each BIU, and uses an IP automatic allocation manner through a dynamic host configuration protocol (DHCP). The IP automatic allocation is performed by a DHCP unit 230 in the NMS server 200, shown in FIG. 2, and contents related to this are illustrated in steps S310 and S320 of the flowchart of FIG. 3.

Referring to S310 and S320 of FIG. 3, if an IP allocation request is received from an arbitrary BIU, the DHCP unit 230 of the NMS server 200 identifies an available IP according to the received IP allocation request, and automatically allocates the available IP to the BIU that transmits the IP allocation request.

Subsequently, in S330 of FIG. 3, if a BIU registration request from the arbitrary BIU having the IP allocated thereto is received through a communication interface unit 250 of the NMS server 200, a BIU registration unit 220 of the NMS server 200 directs a comparison unit 240 of the NMS server 200 to perform comparison between identification information of the BIU that transmits the registration request and information in a previously registered BIU registration table 210.

In this state, the BIU registration request received from the BIU includes BIU identification information and IP information allocated to the corresponding BIU. The BIU identification information may include name information of the corresponding BIU and a device serial number of the corresponding BIU. The BIU registration table 210 of the NMS server 200 is a table in which information on previously registered BIUs are mapped. In the BIU registration table 210, the BIU identification information (i.e., the BIU name information and the device serial number) and the allocation IP information are registered to be mapped to a BIU ID (i.e., a BIU registration ID).

Therefore, the comparison unit 240 of the NMS server 200 may compare between the BIU identification information included in the BIU registration request and BIU identification information mapped and stored in a plurality BIU IDs previously registered in the previously registered BIU registration table 210, thereby deciding the correspondence between the corresponding identification information.

Accordingly, the BIU registration unit 220 can decide that the BIU registration request from the BIU results from a reattempt case of registration request (i.e., a re-registration request case) according to an IP change caused by trouble of the corresponding BIU after the previous registration request, power-off, link fail, various network troubles, etc., a re-registration request case according to replacement of the corresponding BIU, CPU replacement of the BIU, etc., or the registration request of a new BIU.

When the corresponding registration request corresponds to a re-registration request as the decision result, the BIU registration unit 220 uses an existing BIU ID previously registered in the BIU registration table as it is, and updates information stored in the BIU registration table by reflecting information changed according to the re-registration request (i.e., identification information (BIU name/device serial number) of the BIU that transmits the re-registration request and information changed from the existing allocation IP information) (see steps S350 and S360 of FIG. 3).

When it is decided that the corresponding registration request corresponds to a new registration request, the BIU registration unit 220 provides a new BIU ID, and maps identification information of the BIU that transmits the registration request and allocation IP information to the provided new BIU ID, thereby performing new registration (see steps S350 and S365 of FIG. 3).

The following two cases may usually exist as the re-registration request case described above. The first case is a case where the re-registration request is performed as the allocation IP information is changed even though the BIU identification information is not changed. That is, in the embodiment of the present invention, an IP is automatically allocated in the DHCP manner (i.e., allocation of a dynamic IP), an IP change may occur due to trouble of the corresponding BIU, power-off, access fail of communication link, various network troubles, etc. In this case, the identification information of the BIU (i.e., the name information and the device serial number) is not changed, and only the IP change is performed. Therefore, the BIU registration unit 220 identifies, through the comparison unit 240, the existing BIU ID having information corresponding to the BIU identification information included in the re-registration request, and performs only an update operation of changing only allocation IP information among the information mapped to the corresponding BIU ID in the BIU registration table.

The second case is a case where the BIU device serial number is changed in the BIU identification information. The case may occur when the BIU or BIU CPU at the existing installation position may be replaced. In this case, the BIU registration unit 220 identifies the existing BIU ID corresponding to the BIU name information in the BIU identification information included in the re-registration request, and uses the existing BIU ID as it is. In this state, the BIU registration unit 220 performs an operation of updating the changed information, i.e., the BIU device serial number (In this case, the allocation IP information may also be changed, and the IP information is also included in this case).

Figure 5:
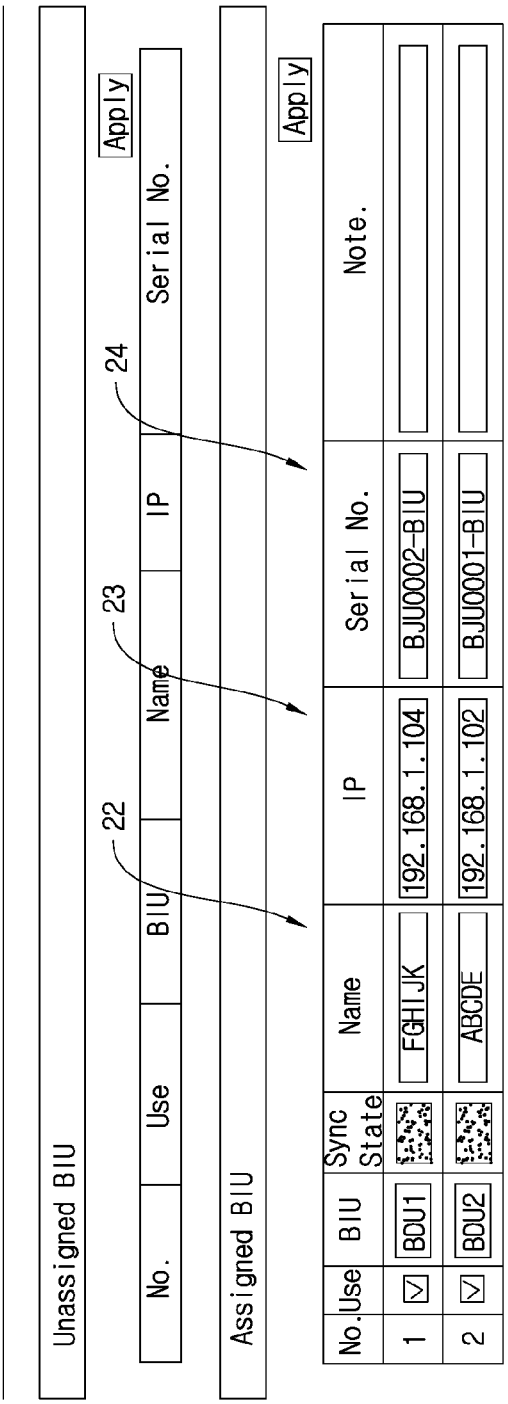

That is, the existing BIU ID is used as it is in both the two cases, and both the two cases have in common that the update operation is performed by reflecting only the changed information. The BIU name information is not changed in either of the cases. This is because the BIU name information is name information properly provided corresponding to the relay installation position. Referring to FIGS. 4 and 5, GUIs with respect to information items to be stored in the BIU registration table are illustrated. Here, reference numeral 21 denotes a BIU ID item, reference numeral 22 denotes a name information item, reference numeral 23 denotes an allocation IP information item, and reference numeral 24 denotes a device serial number item. FIG. 4 illustrates an example in which reception information in a state before a BIU registration process is performed is displayed in the GUI. FIG. 5 illustrates an example in which registration information in a state in which the BIU registration is completed is displayed in the GUI.

As described above, in the relay managing method in the NMS server according to the embodiment of the present invention, the registration process in a new BIU registration case can be simply performed, and a recovery treatment can be performed while using the existing BIU ID as it is even in an exceptional treatment process in a case including trouble of the BIU, replacement of the BIU, network troubles, etc., thereby ensuring the reliability of communication connection between the NMS server and the BIU.

Also, when the DHCP unit 230 of the NMS server is to perform IP re-allocation on the previously registered BIU based on identification information of the BIU even in a situation where IP re-allocation is required (i.e., a situation where IP re-allocation is to be performed as the previously allocated IP cannot be used due to trouble of the BIU, power-off, network troubles, etc. as described above), the existing IP mapped to the previously registered BIU ID can be allocated as an available IP. That is, there is used a method in which the IP mapped in the BIU registration table is first re-allocated to the existing BIU without being allocated to another BIU, while using the automatic allocation manner of the dynamic IP, so that it is possible to implement continuous management of the communication connection between the NMS server and the BIU. It will be apparent that when the IP re-allocation is required, the existing IP may be re-allocated as it is. However, an IP different from the existing IP may be allocated according to a dynamic IP allocation manner.

Also, the NMS server 200 (more specifically, the BIU registration unit 220) may store and link relay setting information on the registered BIU up with the BIU name information. That is, the NMS server 200 may be provided with a backup function of the relay setting information. Accordingly, when there exists information corresponding to any one of the identification information of the BIU that transmits the registration request in the BIU registration table, the NMS server 200 (i.e., the BIU registration unit 220) can recover and use, as it is, the stored and linked relay setting information up with the existing BIU name of the corresponding information in the BIU registration table. That is, the NMS server 200 uses the backed-up relay setting information, so that it is possible to automatically recover the previously set relay setting information even in the trouble or/and replacement case (e.g., CPU replacement, RF module replacement, etc.). Accordingly, it is possible to solve a problem of an erroneous input of setting information, which may occur in a manual input of a manager after replacement due to an equipment trouble, etc.

The relay managing method according to the present invention may be implemented as computer-readable codes on a computer-readable recording medium. The computer readable recording medium includes all kinds of recording media in which data that can be read by a computer system is stored. Examples of the computer readable recording media may be a read only memory (ROM), a random access memory (RAM), a magnetic tape, a magnetic disk, a flash memory, an optical date storage device, and the like. Also, the computer-readable recording medium may be distributed over computer systems connected to a computer communication network, and computer-readable codes distributively stored and executed therein.

While the present invention has been described with respect to the specific embodiments, it will be apparent to those skilled in the art that various changes and modifications may be made without departing from the spirit and scope of the invention as defined in the following claims.

The invention claimed is:

1. A method performed by a management server for managing a relay system, the method comprising:
   receiving a registration request from a Base transceiver station Interface Unit (BIU) coupled to a Base Transceiver Station (BTS), wherein the registration request includes name information, a serial number and an Internet Protocol (IP) address to register the BTS corresponding to the BIU in the relay system, and wherein the name information corresponds to a location of the BIU in the relay system;
   determining whether the BIU corresponding to the received registration request is registered in a BIU management table by searching at least one of the name information and the serial number in the BIU management table;
   if the BIU is not registered in the BIU management table, adding a new ID associated with the name information, the serial number and the IP address in the BIU management table; and
   if the BIU is registered in the BIU management table, updating an entry for the BIU in the BIU management table using at least one of the serial number and the IP address without changing an ID associated with the entry.

2. The method of claim 1, wherein the BIU management table is a table in which name information, a serial number and an IP address are associated with an ID with respect to each of BIUs of the relay system.

3. The method of claim 1, further comprising:
   receiving an IP address allocation request from the BIU; and
   allocating an available IP address to the BIU in response to the IP address allocation request.

4. The method of claim 3, wherein the allocating comprises, if the BIU is registered in the BIU management table, selecting a pre-stored IP address for the BIU in the BIU management table as the available IP address.

5. The method of claim 1, further comprising
   if the BIU is registered in the BIU management table, restoring configuration information for the BIU; and
   transmitting the restored configuration information to the BIU.

6. A management server for managing a relay system, server comprising:
   a communication interface unit configured to receive a registration request from a Base transceiver station Interface Unit (BIU), wherein the registration request includes name information, a serial number and an IP address to register the BTS corresponding to the BIU in the relay system, and wherein the name information corresponds a location of the BIU in the relay system; and
   a registration control unit configured to:
      determine whether the BIU corresponding to the received registration request is registered in a BIU management table by searching at least one of the name information and the serial number in the BIU management table;
      if the BIU is not registered in the BIU management table, adding a new ID associated with the name information, the serial number and the IP address in the BIU management table; and
      if the BIU is registered in the BIU management table, updating an entry for the BIU in the BIU management table using at least one of the serial number and the IP address without changing an ID associated with the entry.

7. The management server of claim 6, further comprising a dynamic host configuration protocol (DHCP) unit configured to allocate an available IP address to the BIU in response to receiving an IP address allocation request from the BIU through the communication interface unit.

8. The management server of claim 7, wherein the DHCP unit is further configured to, if the BIU is registered in the BIU management table, selecting a pre-stored IP address for the BIU in the BIU management table as the available IP address.

9. The management server of claim 6, wherein the registration control unit is further configured to, if the BIU is registered in the BIU management table, restoring configuration information for the BIU and transmitting the restored configuration information to the BIU through the communication interface unit.

* * * * *